March 12, 1957   E. BUEHLER   2,785,058
METHOD OF GROWING QUARTZ CRYSTALS
Filed April 28, 1952   2 Sheets-Sheet 1

INVENTOR
E. BUEHLER
BY
Edwin B. Cave
ATTORNEY

March 12, 1957 E. BUEHLER 2,785,058
METHOD OF GROWING QUARTZ CRYSTALS
Filed April 28, 1952 2 Sheets-Sheet 2

INVENTOR
E. BUEHLER
BY Edwin B. Cave
ATTORNEY

United States Patent Office 2,785,058
Patented Mar. 12, 1957

2,785,058

METHOD OF GROWING QUARTZ CRYSTALS

Ernest Buehler, Chatham Township, Morris County, N. J., assignor to Bell Telephone Laboratories, Incorporated, New York, N. Y., a corporation of New York Application April 28, 1952, Serial No. 284,768

13 Claims. (Cl. 23—301)

This invention relates to methods of growing quartz crystals synthetically. More particularly it relates to methods of growing quartz crystals of sufficient size for piezoelectric use from quartz seeds in aqueous media under high temperatures and pressures. This application is a continuation-in-part of application Serial No. 68,096, filed December 30, 1948, now abandoned.

The scientific literature records the efforts of numerous investigators over the past century to grow quartz crystals from siliceous melts and from aqueous silicate solutions. One of the most successful of the early investigators was Spezia, who utilized the variation, with temperature, of the solubility of quartz in an aqueous alkaline liquid (Accad. Sci. Torino, Atti., vol. 33, pages 289–308; vol. 40, pages 254–262; vol. 41, pages 158–165; vol. 44, pages 95–107). Spezia succeeded in substantially increasing the size of quartz crystal seeds suspended below a nutrient mass of quartz fragments maintained at a higher temperature than the seeds, both the seeds and nutrient being immersed in an alkaline aqueous liquid contained in a pressure-resistant vessel and maintained at elevated temperatures and pressure. It has been estimated that Spezia, under his best conditions was able to obtain an average growth of only about .004 inch of quartz per day along the axis of the crystal.

More recently, higher initial rates of growth have been obtained on quartz crystal seeds using fused silica as a nutrient in an aqueous alkaline medium above the critical temperature and critical pressure of water. In these later attempts, no effort was made to maintain a temperature differential between the quartz seed and the fused silica nutrient, the growth being dependent upon the fact that the amorphous fused silica is much more soluble under the conditions maintained than is crystalline quartz. The effectiveness of this process is limited by the fact that the unstable supersaturated solution of silica not only deposits silica on the quartz seed but also forms large numbers of spurious seeds, so that the supply of used silica nutrient is quickly consumed, with the major portion being lost in the formation and growth of the spurious seeds and with only a small part contributing to the growth of the desired crystal. Thus, it is impossible to sustain a continued high rate of growth by this process and, although growth may be rapid for a few hours, it falls off to substantially zero as the amorphous nutrient is all converted to the crystalline form, usually in about a day.

By the process of the present invention on the other hand, it has been found possible to maintain rates of growth as high as about .1 inch per day under reproducible conditions and to continue this growth for long periods of time, limited only by the supply of nutrient in the growing vessel and by the ability of the vessel to provide space for the growing crystal. Crystals weighing more than 1 pound have been grown in less than two months. In the process of the present invention, crystalline quartz is used as the nutrient in an aqueous medium and the growth of the seed crystal is dependent upon the small temperature differential maintained between the aqueous medium in the vicinity of the seed and that in the vicinity of the nutrient. Under the conditions of operation, the quartz nutrient is slowly dissolved in the aqueous solvent at the higher temperature and the dissolved silica is then deposited on the quartz seed at the lower temperature.

Since the process of the present invention is carried out at elevated temperatures and pressures, it is necessary that it be carried out in apparatus capable of safely withstanding these conditions without leakage. It is desirable for economic reasons that the relatively expensive pressure-resistant portion of the apparatus be substantially unaffected by the process so that it can be reused a number of times.

The process of the present invention and apparatus which has been found suitable for carrying it out can be more easily explained by reference to the accompanying drawing, in which.

Figure 1:
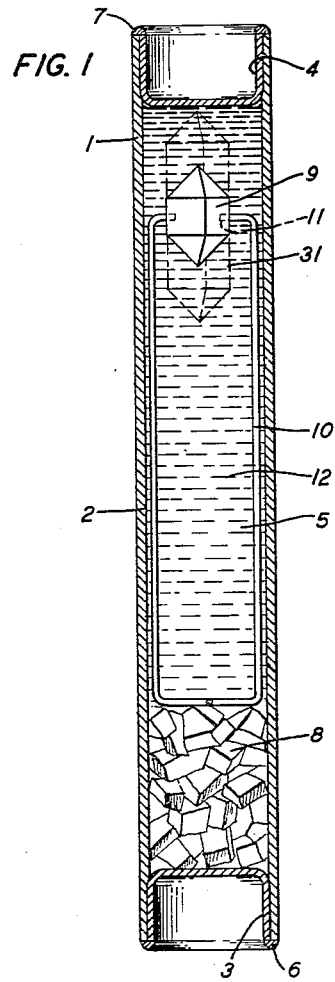
Fig. 1 is a front elevation in section of an expendable bomb liner containing a seed crystal, aqueous solvent and nutrient.

In the apparatus of Fig. 1, the growing of the crystals is carried out in an expendable liner 1, which is not of itself capable of withstanding the pressures generated in the process but which serves to seal in the aqueous medium so as to prevent leakage and which also permits a type of pressure-resistant vessel to be employed which is safe against explosion and which can be reused many times. The liner 1 is made up of a cylindrical tube 2, which may advantageously be formed of a low carbon steel, into the ends of which are forced two cups 3, 4 which serve to form a completely enclosed chamber 5. The cups 3, 4 are securely welded to the cylindrical tube 2 around the circumferences of the edges 6, 7, thus completely sealing the chamber 5.

The liner 1 is charged with the quartz seed, nutrient material and aqueous medium after a cup has been inserted in one end of the cylinder and welded thereto but before the other cup has been inserted. Thus, cup 3 is inserted and welded at edge 6. Then, with the cylinder in a vertical position, the nutrient quartz 8 is placed in the bottom. Then one or more quartz seed crystals 9 are inserted, suitably mounted as by wire frame 10, so as to be disposed in a suitable position above the nutrient. The seed crystal may be mounted by means of holes 11 drilled in its sides, into which the ends of the wire frame are inserted, or by any other suitable means. The chamber 5 is then filled to the required level with the aqueous medium 12. The upper cup 4 is forced into place and welded at the edge 7.

Figure 2:
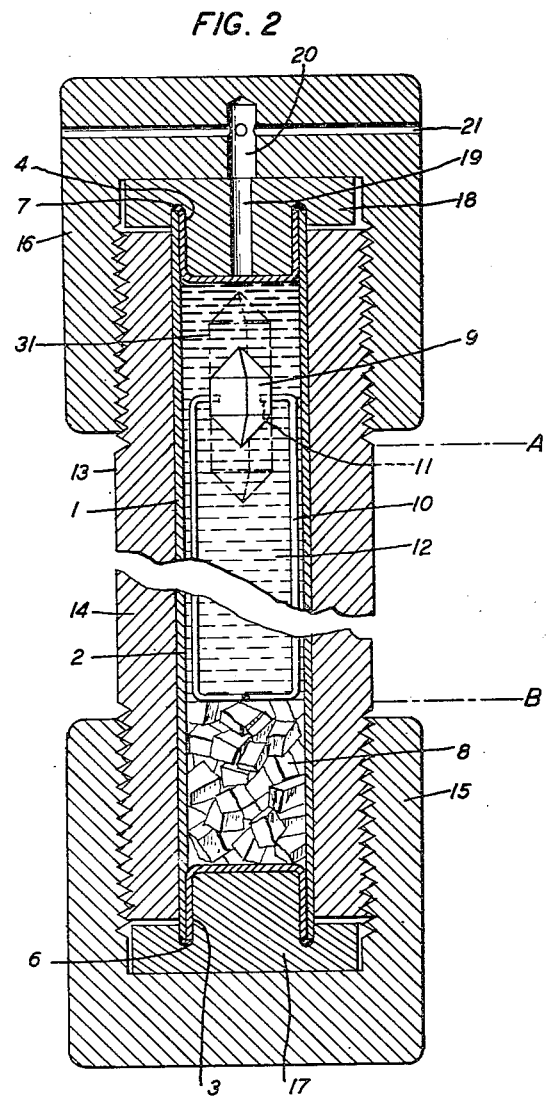
Fig. 2 is a front elevation in section of a pressure-resistant bomb containing the liner of Fig. 1.

The charged liner 1 is placed in a pressure-resistant bomb 13 as shown in Fig. 2. This bomb is made up of a heavy cylindrical tube 14 having caps 15, 16 screwed on each end. The inner bore of the cylindrical tube 14 is of such size that it snugly fits the cylindrical tube 2 of the liner while permitting easy insertion of the liner.

The pressure generated within the sealed liner during operation tends to spread the tube 2 from each of the cups 3, 4 at their surfaces of contact and thus to break the welds at the edges 6, 7, permitting leakage. This is avoided by providing reinforcement at and in the vicinity of the welded edges by means of the retaining caps 17, 18. These caps have an annular recess into which the welded edges 6, 7 of the liner are forced. The portion of each retaining cap which fits into the recess of the corresponding cup completely fills this recess and thus supports the cup against the internal pressure. When held in place by the screw caps 15, 16 of the bomb, the retaining caps 17, 18 effectively prevent leakage at the welds.

The upper retaining cap 18 is provided with a central bore 19 of such size that at a predetermined safe pressure, higher than the normal operating pressure, the portion of the cup 4 opposite the opening in the retaining cap will rupture and release the pressure. In this manner, an effective safety release is provided in the event that the pressure within the bomb accidentally becomes excessive. The upper screw cap 16 is provided with a central passage 20 and radial passages 21 which serve to conduct the released vapor to the outside of the bomb.

Any suitable dimensions and materials may be used in the construction of the bomb and the liner shown in Figs. 1 and 2 as required by the pressures developed in the process. It has been found convenient to form the chamber 5 with a height from about eight to twelve or sixteen times its diameter, but these proportions may be varied within any practical limits. The liner may conveniently be made of seamless tubing formed of a low carbon steel, such as commercial steels containing not more than .3 percent carbon and preferably not more than .2 percent carbon, but any metal of adequate strength and resistance to corrosion by the contents of the liner at the temperatures and pressures employed may be used. When maximum pressures up to about 20,000 pounds per square inch are employed, it has been found convenient to form the tube 14 of the bomb from suitably tempered tool steel or stainless steel with an outer diameter which is twice the internal bore. Such bombs can conveniently be constructed with internal diameters between 1 inch and 6 inches. The apparatus shown in Figs. 1 and 2 is more particularly described and claimed in United States Patent 2,547,521, issued to the present applicant.

Figure 5:
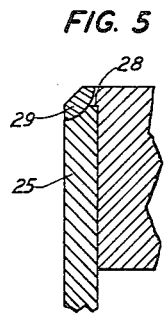
Fig. 5 is a sectional showing of an upper corner of the liner shown in Fig. 4.
Figure 4:
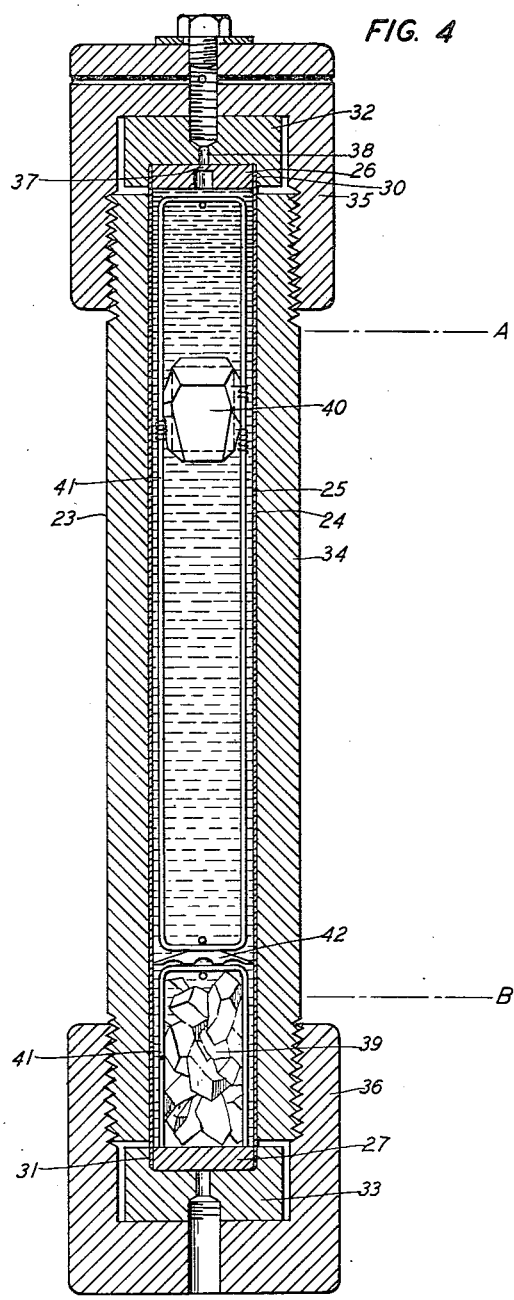
Fig. 4 is a front elevation in section of a pressure-resistant bomb and liner of somewhat different construction.

An alternative bomb and liner construction, which is particularly desirable when the maintenance of a higher temperature differential between the quartz seeds and the nutrient is required, is shown in Fig. 4. In this figure, the bomb 23 is constructed so as to receive a liner 24 which is sealed in a different manner from the liner shown in Fig. 1. The liner 24 is made up of a cylindrical steel tube 25 into the ends of which are fitted circular end plates 26 and 27. These end plates are shaped so as to present a shoulder 28 (Fig. 5) which extends over the edge of the tube 25. The shoulder 28 and the edge of the tube 25 in contact with it are welded together, as with a helium arc torch, to form a welded edge 29, which is machined flush with the outer diameter of the tube 25. The liner is charged with nutrient, seeds and growing medium in the same manner as the liner of Fig. 1.

The ends of the tube 25 are machined to form slightly tapered sections 30, 31. Retainer caps 32, 33, having tapered recesses to fit the tapered sections 30, 31 are forced on the ends of the tube 25 after the liner is inserted in the cylindrical tube 34 of the bomb 23. Screw caps 35 and 36 are then screwed on the ends of tube 34.

The end plate 26 has a central portion 37 of reduced thickness, opposite an opening 38 in the cap 32 so as to form a safety release as described above.

The chamber within the liner 24 contains nutrient 39 in its lower portion and a seed or seeds 40 mounted in its upper portion by means of wire support 41. A baffle 42 is also supported just above the nutrient by means of the wire support. The baffle has an essentially circular periphery which fits the inside circumference of the tube 25 with very little clearance. The baffle may be a flat plate but preferably is of slightly conical shape having its apex facing upward.

Figure 6:
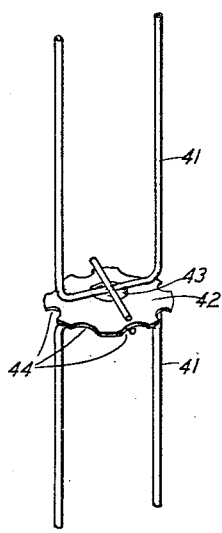
Fig. 6 is a perspective view of the baffle and a portion of the wire support shown in Fig. 4.

The baffle, as shown in Fig. 6, has a central opening 43 and a plurality of peripheral openings 44 distributed about its circumference. Preferably, the sum of the areas of the peripheral openings is equal to the area of the central opening.

The baffle serves to maintain a substantial temperature differential between the aqueous medium above it and that below it while allowing sufficient circulation to permit transport of silica readily from the nutrient to the seed. The degree of temperature differential can be controlled by controlling the area of the openings in the baffle. Thus, the total area of the openings may vary between 5 percent and 50 percent of the total baffle area. A convenient ratio of baffle opening area to total baffle area is about 20 percent.

The crystal growing process can be carried out in direct contact with the interior surface of the steel liner 1 or 24. However, under certain conditions, the iron tends to enter the system and retard the rate of growth of the quartz. This effect can be reduced by coating the inside of the liner with a fatty acid, such as oleic acid or stearic acid, or with mineral oil, prior to charging.

It is preferable, however, to plate the inside of the liner with a metal which is inert to the process, such as copper or silver. The plating can be accomplished by conventional electroplating techniques. A liner having the structure of liner 24 lends itself particularly to such internal plating since the interior of the tube 25 and the inner surfaces of the end plates 26 and 27 can be plated prior to assembly without interfering with the soundness of the seal which is produced. When the liner is plated with copper, the reaction system should be free of fatty acids or salts of fatty acids since these substances attack the copper at the reaction temperatures.

Figure 3:
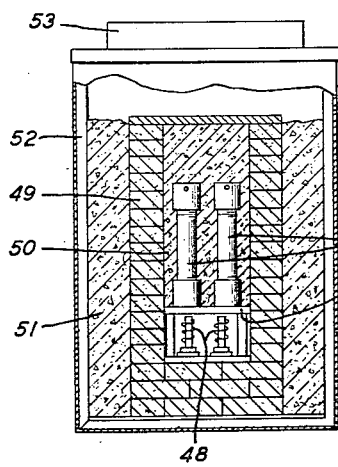
Fig. 3 is a front elevation, partly in section, of a furnace in which a plurality of the bomb assemblies of Fig. 2 are heated.

In order to carry out the growing of the crystal, one or more charged bombs 45 (which may be bombs 13 of Fig. 2 or 23 of Fig. 4) are placed in a suitable furnace 46 as shown in Fig. 3. In the furnace of Fig. 3, the bombs 45 are set vertically on a hot plate 47 which is heated from below in any suitable manner, as by the electric resistance heaters 48. The hot plate, heaters and bombs are surrounded by a fire brick enclosure 49, open at the top, defining a chamber 50.

In order to maintain the required temperature gradient between the bottoms and tops of the bombs, the space 50 between the bombs and the enclosure 49 is filled to the required level with any suitable heat resistant, heat insulating substance such as vermiculite. When the space 50 is completely filled with heat insulating material, the minimum temperature differential between the tops and bottoms of the bombs is maintained. This temperature differential is increased as the level of insulating material is lowered, exposing more and more of the upper part of the bombs.

A supplementary heat insulation 51 of any suitable material, such as vermiculite, surrounds the fire brick enclosure 49 and is contained in an outer shell 52, which may be formed of sheet metal, having a sheet metal cover 53 which is vented to permit escape of gases if the safety device of a bomb is released. The furnace is preferably provided with automatic controls which maintain the hot plate 47 at a fixed temperature.

The hot plate of the furnace is maintained at the required temperature for a period of time sufficient to permit the desired amount of growth of the crystal seed at the expense of the quartz nutrient. The furnace is then allowed to cool, the bombs are removed and opened, and the crystals are removed from the bombs.

In order to eliminate the ghosts or cloudy planes which are formed where the new crystal growth begins on the original seed, it is sometimes found advantageous to heat the tops of the bombs as well as the bottoms for a short period at the beginning of the run. This causes dissolution of a small amount of quartz from the surface of the seed so that, when top heating is stopped, crystal growth can take place without the outline of the original seed being visible.

In order for a practical rate of growth to be obtained, it is necessary for certain conditions to be maintained. Since spurious seeding must be eliminated or minimized in order to maintain a sustained high growth rate, it is necessary that forms of silica be excluded from the system which are substantially more soluble than quartz and which would therefore lead to an unstable supersaturated solution. The nutrient which is used should therefore be substantially free of forms of silica other than quartz.

The quartz used as the nutrient should possess a particle size such as to present a sufficient surface area to the solvent to permit the quartz to be dissolved sufficiently rapidly to sustain the desired rapid growth of the seed crystal. It has been found that with proper control of the other conditions, sustained rapid growth may be obtained with a nutrient consisting of quartz particles of such size that the average particle diameter is as large as about 1/8 to 1/4 the diameter of the growing chamber 5. When quartz with a decreasing particle size is used, the rate of dissolution increases.

When quartz of excessively small particle size, such as a size which will pass a sieve having openings smaller than .01 inch, is placed as a mass in the bottom of the reaction chamber, the temperature differential between the bottom and the top of the mass causes the deposition of quartz at the top of the mass to an extent sufficient to glaze over the upper surface of the mass so that it becomes substantially impermeable to the aqueous transfer medium. After this occurs, the effective surface for dissolution becomes not the total surface of the particles but only the upper surface of the mass, thus retarding the process. This effect can, of course, be overcome by providing mechanical means for maintaining a sufficient number of channels in the mass to provide the required surface area.

A convenient size of quartz for use as the nutrient is in the form of particles which will pass a No. 4 sieve (.187-inch openings) but not a No. 6 sieve (.132-inch openings).

The seed 9 may consist of any whole crystal, fragment or cut of natural or synthetic quartz. The seed should be free of twinning if it is desired to produce an untwinned crystal. Since the growth of the crystal is essentially entirely in the direction of the primary crystallographic axis, with substantially no growth in perpendicular directions, it is convenient to use a plate cut so that its faces are perpendicular to the crystallographic axis. It is also convenient to mount the seed with the crystallographic axis vertical so that the growth will take place along the length of the cylindrical chamber 5, as shown by the broken lines 31 of Figs. 1 and 2. Another cut that is more advantageous, in that it gives the most rapid rate of growth, is a plate having its faces cut parallel to a minor rhombohedral face of the crystal. Best growth is obtained if this plate is mounted with its faces parallel to the axis of the bomb. When so mounted, growth of the crystal will take place in a direction at an angle of about 38 degrees to the axis of the bomb. If desired, the plate can be mounted at an angle so that growth is along the axis of the bomb, but this may lead to adherence of spurious seeds on the sloping faces and thus endanger the normal growth.

Growth of the seed crystal has been obtained by the process of the present invention only when the aqueous medium used for transporting the silica from the nutrient to the seed has contained sodium ions. No substantial growth has been obtained with ions of the other alkali metals. The most suitable compounds for supplying the sodium ions have been found to be sodium hydroxide, sodium carbonate and sodium silicate. Since sodium silicate is the reaction product of silica and sodium hydroxide, it is apparent that whether sodium hydroxide or sodium silicate is added initially, the solute will be sodium silicate during the operation of the process.

Sodium carbonate is a desirable compound for use since it permits the rapid growth of quartz with a small temperature differential between nutrient and seed. However, in a reaction chamber in which a higher temperature differential can be readily maintained, it may be more advantageous to use sodium hydroxide (or sodium silicate) since the system is more stable with this compound so that there is a lesser tendency toward spurious seeding and since clearer, more perfect crystals are formed.

Growth can be obtained with other inorganic sodium salts, particularly salts of weak acids. Salts of sodium with organic acids which are stable against substantial decomposition at the temperatures and concentrations used may also be employed. Mixtures of sodium hydroxide and sodium carbonate or of sodium silicate and sodium carbonate or of all three compounds may be used. The addition of small concentrations, of the order of about .001 normal to about .005 normal, of sodium salts of long chain fatty acids, such as sodium oleate, to solutions of inorganic sodium compounds appears to improve the surface appearance of the crystals produced except in copper plated chambers.

It is sometimes found desirable to add small amounts of sugar or formaldehyde to the aqueous medium, particularly when sodium carbonate is present, to improve the appearance of the crystals which are produced. The rate of growth is also increased slightly by the presence of these materials. Concentrations of these substances of the order of 0.1 grams per 50 cubic centimeters of aqueous medium have been found satisfactory.

For reasonably rapid growth, the concentration of sodium ions in the aqueous solution should be at least about 1/2 normal and preferably at least 1 normal. In general, as the concentration is increased, the rate of growth increases somewhat until concentrations of about 4 normal or 5 normal are reached. Further increase in concentration appears to produce only a slight increase in growing rate, but obviously higher concentrations may be used if desired.

The growing of the quartz crystals by the process of the present invention is carried out with the aqueous solution at temperatures and pressures preferably above the critical temperature and critical pressure of the aqueous solution, which critical temperature and pressure are essentially the same as the critical temperature and pressure of water. All parts of the chamber in which the growing takes place are maintained at temperatures preferably above the critical point.

The temperature in the coolest part of the chamber should not fall below 350° C. and should preferably be at least 360° C. When the sodium ions in the aqueous medium are derived primarily from sodium carbonate, this temperature should be at least 375° C. and preferably at least 380° C.

The rate of growth of the crystal appears to increase somewhat as the average temperature in the chamber is increased but the temperature of the growing crystal should be maintained safely below 573° C., the inversion temperature for quartz, and safely within the mechanical limitations of the bomb in which the growing takes place. It is preferable that the temperature in the vicinity of the crystal, or more preferably in the hottest part of the chamber, not exceed about 550° C. More practical operating temperatures are below 500° C., and preferably below 450° C., at the upper surface of the nutrient mass or even in the hottest part of the bomb. With an aqueous medium containing sodium carbonate, very satisfactory results have been obtained with the operating conditions such that the externally measured temperature at the portion of the bomb corresponding to the upper surface of the mass of quartz nutrient is between about 395° C. and about 415° C. and preferably at about 400° C. With an aqueous medium in which the sodium ions are derived primarily from sodium hydroxide, this temperature is preferably between 400° C. and 425° C. The externally measured temperature at this point is essentially the internal temperature. In general, a practical rate of growth cannot be achieved if the external temperature at this point falls below about 380° C.

The density of the aqueous medium in which the quartz crystal is grown, and therefore the pressure existing in the bomb during the growing operation, exert a considerable influence upon the rate at which the quartz crystal is grown. The density, or inversely the specific volume, of the aqueous medium is controlled by the degree to which the free space in the growing chamber is filled with the aqueous solution prior to the sealing of the chamber. Filling about 33 percent of the free space in the chamber with liquid at room temperature will result in a specific volume, at the critical temperature, which is equal to the critical volume. Practical rates of growth can be achieved by the present process only by using considerably higher degrees of fill, with correspondingly lower specific volumes.

To obtain a practical rate of growth, it is necessary to fill the free space of the chamber, excluding the space occupied by nutrient, seed and supporting means, to at least 60 percent with the liquid aqueous growing medium at room temperature. As the degree of fill is increased, the growing rate increases markedly. The upper limit to the degree of fill to be used is set only by the ability of the bomb to withstand the pressure which is generated. A fill of about 80 percent has been found very satisfactory but a fill of 90 percent will give better results in a bomb designed to withstand the pressure.

With a liquid fill of 60 percent of the free space at room temperature, the specific volume of the aqueous solution above the critical point is about 1.67 times the specific volume of the liquid at room temperature. With fills of 80 percent and 90 percent, the specific volumes above the critical point are 1.25 and 1.11 times those at room temperature, respectively.

It is important to the rate of growth of the crystal that the proper temperature differential be maintained throughout the process, between the aqueous solvent leaving the mass of quartz nutrient and the aqueous solvent in the vicinity of the quartz seed crystal. With a very small temperature differential, the rate of growth is slow. As the differential increases, the rate of growth increases but, if it becomes excessive, a degree of spurious seeding occurs on the walls of the bomb. In avoiding the possibility of spurious seeding, it is necessary to avoid an excessive temperature differential not only between the nutrient mass and the seed crystal but also between the nutrient mass and any portion of the bomb. As indicated above, the temperature differential can be controlled with the apparatus shown in the drawing by varying the amount of insulation placed around the bombs in the furnace. The tendency toward spurious seeding is much less when an aqueous medium is used in which the sodium ions are derived from sodium hydroxide than when the sodium ions are derived from sodium carbonate.

In the apparatus shown in the drawing, it is convenient to measure the temperature differential of the external surface of the bomb at the levels indicated by the broken lines labeled A and B in Figs. 2 and 4. The external measurement at the level A gives an indication of the internal temperature at that level, which internal temperature is essentially the same as the temperature in the coolest part of the growing chamber. The external measurement at the level B gives an indication of the internal temperature at the upper surface or coolest portion of the nutrient mass.

In steel bombs, which are upright circular cylinders and in which the inside diameter is approximately one-half of the outside diameter, the externally measured temperature differential gives a reasonably consistent indication of conditions within the bomb, regardless of bomb size. In the longer bombs without baffles, somewhat higher growth rates can be obtained for the same temperature differential than in the shorter bombs. The use of a baffle in a shorter bomb has an effect similar to lengthening the bomb.

As indicated above, when sodium hydroxide (or sodium silicate) is used as a source of sodium ions, a higher temperature differential can be tolerated without spurious seeding than when sodium carbonate is used. A higher temperature differential is also required with sodium hydroxide than with sodium carbonate in order to achieve the same rate of quartz growth.

When sodium carbonate is used as the source of more than 50 percent of the sodium ions, the externally measured temperature differential should be held to between 5° C. and 25° C. In most instances this differential will be held to between 10° C. and 20° C.

When sodium hydroxide is used as the sole or primary source of sodium ions, a higher temperature differential should be used to obtain rapid growth. A temperature differential of about 50° C. has been found suitable. Differentials as low as about 25° C. or 30° C. and as high as 70° C. can be used satisfactorily.

When mixtures of sodium hydroxide and sodium carbonate are used, it is apparent that the optimum temperature differential for rapid growth without spurious seeding can be made to fall between the optimum of about 50° C. for sodium hydroxide alone and the optimum of between 10° C. and 20° C. for sodium carbonate alone.

The actual temperature differential in the aqueous medium within the bomb between the corresponding levels approximates the external differential but is presumably somewhat less. A practical growing rate can be achieved with the seed suspended near the top of the chamber, where it secures the benefit of the full temperature differential, or at a lower point which may be only a small distance above the nutrient mass, at which point its growth will be somewhat slower because of the smaller temperature differential. In a bomb equipped with a baffle, it has been found that the rate of growth of the seed immediately above the baffle is approximately 75 percent of the rate of growth of the seed at the top of the chamber.

The optimum temperature differential within the ranges set forth above may also be dependent upon other operating conditions, such as the particle size of the quartz nutrient. With the larger particle sizes, the best results are obtained with the greater temperature differentials. With smaller particle sizes, smaller temperature differentials give the best results.

In general, when sodium carbonate is used, the clearest crystals are produced only with the slower growth rates. With the faster rates of growth, the crystals which are produced have an etched surface appearance. However, the difference is only a surface one and the crystals of etched appearance are fully as suitable for piezoelectric use as are the clear ones. As noted above, when the growth is pushed too rapidly, spurious seeding may occur under certain conditions. However, even some spurious seeding may be tolerated if seed plates are mounted with growing faces in a vertical position provided the spurious seeding does not become so pronounced as to alter the normal growth of the faces of the crystal.

The following specific examples will illustrate the manner in which the present invention may be practiced.

Example 1

A cylindrical liner formed of seamless low carbon steel tubing having a wall thickness of 1/16 inch welded closed with low carbon steel cups having a wall thickness of 1/32 inch, as shown in Fig. 1, defining a growing chamber about 1 inch in diameter and 11¼ inches in length, was charged with 50 grams of a nutrient consisting of quartz particles of such a size as to pass a No. 4 sieve but not a No. 6 sieve, an aqueous solution of sodium carbonate, sodium hydroxide and sodium oleate, and six quartz seed crystals. The concentrations of the sodium compounds in the solution were 1 normal for the sodium carbonate, .1 normal for the sodium hydroxide and .003 normal for the sodium oleate. Sufficient of the solution was present to fill 80 percent of the free space of the chamber at room temperature, excluding the volume of the nutrient, seeds and supporting means. The seed crystals were in the form of plates about .05 inch in thickness and cut with their faces parallel to a major rhombohedral face of the crystal. The seeds were suspended on a wire support with their faces vertical. They were mounted with their centers about ¾ inch apart with the uppermost seed situated about 1 inch from the top of the chamber and the lowest seed about 2½ inches above the surface of the nutrient mass. The liner was inserted in a stainless steel bomb of appropriate size and of a structure as shown in Fig. 2 and the bomb was placed in a furnace as shown in Fig. 3. The temperature of the hot plate and the amount of insulation were adjusted so that the external temperature of the bomb at level B in Fig. 2 was maintained at 405° C. and the external temperature of the bomb at level A was maintained at 18° C. lower than level B. These conditions were maintained for nine days, at which time the bomb was cooled and the crystals removed. It was found that the upper three crystals, which because of their position in the bomb were maintained at a higher temperature differential from the nutrient, had grown an average of about .09 inch per day along the main crystallographic axis. The lower three crystals, which had been maintained at a lower temperature differential from the nutrient, had grown an average of about .07 inch per day. The crystals had an etched surface appearance but had perfectly clear interiors when observed immersed in a liquid of the same index of refraction as quartz.

Example 2

A charged bomb was prepared in the same manner as in Example 1, except that the growing chamber was 1 inch in diameter and 8 inches long, 30 grams of quartz nutrient were used, the aqueous solution contained only sodium carbonate in a concentration of 4 normal, and four quartz seeds were suspended one above the other in the upper part of the bomb. The bomb was placed in the furnace and the external temperature at level B was maintained at 400° C. with the external temperature at level A being maintained at about 10° C. lower than level B. After these conditions had been maintained for about two weeks, the bomb was allowed to cool and the crystals were removed. They were found to have grown at an average rate of about .04 inch per day with the upper crystals growing more rapidly than the lower crystals. The crystals had an etched surface appearance but a clear interior.

Example 3

A charged bomb having the structure shown in Fig. 4 was prepared. The bomb had an inside diameter of 3¾ inches, an outside diameter of 8 inches and an inside length of 48 inches. A baffle was used in which the area of the openings constituted 20 percent of the total baffle area. A quartz nutrient having a particle size between ¼ inch mesh and ½ inch mesh was employed. The aqueous medium was a 1 normal solution of sodium hydroxide. The interior of the steel liner was silver plated. Five seed crystals were suspended, one above the other, in the upper part of the bomb with the top seed near the top of the bomb and the bottom seed just above the baffle. The seeds were CT cut quartz crystals which were suspended with their growing faces in a vertical position. A 50° C. temperature differential, as measured on the outside of the bomb, was maintained between the level A and the level B of Fig. 4, the level B being maintained at 410° C. and the level A being maintained at 360° C. The volume of aqueous medium which was charged into the bomb at room temperature constituted 80 percent of the free space in the bomb. An average growth rate of 0.04 inch per day was obtained in this manner for a period of sixty days. No spurious seeds were present and the crystals produced were clear, the largest weighing nearly one pound.

The tests described above have been carried out with bombs which are circular cylinders mounted with their axis in a vertical position. It has been found that even more advantageous results can be obtained in some cases by tilting the axis of the bomb to an angle up to ten degrees from the vertical.

The description of the invention above has been in terms of its specific embodiments and, since modifications and equivalents will be apparent to those skilled in the art, is intended to be illustrative rather than to constitute a limitation upon the invention.

What is claimed is:

1. The method of synthetically growing quartz crystals which comprises suspending a quartz seed above a nutrient mass of crystalline quartz particles within an essentially cylindrical bomb having its axis disposed substantially vertically, said quartz particles having a particle size between about .01 inch and about one-quarter the diameter of the bomb, said bomb containing an amount of an aqueous solution of sodium hydroxide such as to fill at least 60 percent of the free space in said bomb at room temperature, the diameter of the external cylindrical surface of said bomb being about twice the internal diameter of said bomb, sealing the bomb, heating all parts of the bomb to temperatures of at least 350° C. but below the inversion temperature of quartz and maintaining the external temperature of the bomb, at a point substantially adjacent the upper surface of the nutrient mass, at a value of at least 380° C. and at a value between about 30° C. and about 70° C. higher than the external temperature of the bomb adjacent its upper end until a substantial increase in the size of said seed has occurred.

2. The method described in claim 1 wherein the aqueous solution fills at least 80 percent of the free space in the bomb at room temperature, wherein the external temperature of the bomb adjacent the upper surface of the nutrient is between 400° C. and 425° C. and wherein the external temperature of the bomb adjacent its upper end is at least 350° C.

3. The method described in claim 2 wherein the seed crystal is a plate suspended with its growing faces in an essentially vertical position.

4. The method described in claim 3 wherein the temperature differential between the external surface of the bomb adjacent its upper end and the external surface of the bomb adjacent the upper surface of the nutrient is about 50° C.

5. The method described in claim 4 wherein the external surface of the bomb adjacent the upper surface of the nutrient is maintained at a temperature of about 410° C. and the external surface of the bomb adjacent its upper end is maintained at about 360° C.

6. The method of synthetically growing quartz crystals which comprises suspending a quartz seed above a nutrient mass of crystalline quartz particles within an essentially cylindrical bomb having its axis disposed substantially vertically, said quartz particles having a particle size between about .01 inch and about one-quarter the diameter of the bomb, said bomb containing an amount of an aqueous solution containing sodium ions such as to fill at least 60 percent of the free space in said bomb at room temperature, at least 50 percent of the sodium content of said solution being present as sodium carbonate, the external diameter of said bomb being about twice its internal diameter, sealing the bomb, heating all parts of the bomb to temperatures of at least 375° C. but below the inversion temperature of quartz and maintaining the external temperature of the bomb, at a point substantially adjacent the upper surface of the nutrient mass, at a value of at least 380° C. and at a value between about 5° C. and about 25° C. higher than the external temperature of the bomb adjacent its upper end until a substantial increase in the size of said seed has occurred.

7. The method described in claim 6 wherein the aqueous solution fills at least 80 percent of the free space in the bomb at room temperature, wherein the external temperature of the bomb adjacent the upper surface of the nutrient is between 395° C. and 415° C. and is between 10° C. and 20° C. higher than the external temperature of the bomb adjacent its upper end, which is maintained at a value of at least 375° C.

8. The method described in claim 7 wherein the particle size of the quartz nutrient is such that the particles will pass a sieve having openings of about .187 inch, but will not pass a sieve having openings of about .132 inch.

9. The method of synthetically growing quartz crystals comprising suspending a quartz seed above a nutrient mass of crystalline quartz particles in an essentially cylindrical steel bomb having its axis substantially vertically disposed, said quartz particles having a particle size between about .01 inch and about one-quarter the diameter of the bomb, said bomb containing an amount of an aqueous solution containing sodium ions such as to fill at least 60 percent of the free space in said bomb when in the liquid state at room temperature, the diameter of the external cylindrical surface of said bomb being about twice the internal diameter of said bomb, sealing said bomb, heating said bomb at its lower end in such manner that the temperature of the external cylindrical surface of said bomb at a point substantially adjacent the upper surface of said nutrient mass is at least 380° C. but below the inversion temperature of quartz and the temperature of the external cylindrical surface of said bomb adjacent the upper end of the bomb is between about 5° C. and about 25° C. lower than the said temperature opposite the upper surface of the nutrient, maintaining said temperature conditions until a substantial increase in the size of said seed has occurred, cooling said bomb and removing said grown seed therefrom.

10. The method described in claim 9 wherein the bomb initially contains an amount of said aqueous solution to fill at least 80 percent of the free space in said bomb in the liquid state at room temperature, wherein the aqueous solution initially present in the bomb is a solution of sodium carbonate and sodium hydroxide, the concentration of the sodium carbonate being about 1 normal, the concentration of the sodium hydroxide being about .1 normal, wherein the particle size of the quartz nutrient is such that the particles will pass a sieve having openings of about .187 inch but will not pass a sieve having openings of about .132 inch and wherein the external surface of the bomb adjacent the upper surface of the nutrient is maintained between about 395° C. and about 415° C.

11. The method described in claim 10 wherein the aqueous solution contains sodium oleate in a concentration of about .003 normal.

12. The method of synthetically growing quartz crystals comprising suspending a quartz seed above a nutrient mass of crystalline quartz particles within a sealed bomb having an essentially cylindrical internal chamber the axis of which is disposed substantially vertically, said quartz particles having a particle size between about .01 inch and about one-quarter the diameter of the bomb, said chamber containing an amount of an aqueous solution of sodium hydroxide such as to fill at least 60 percent of the free space in said chamber at room temperature, heating said bomb to a temperature at which the contents of said chamber are at a temperature of at least 350° C. but below the inversion temperature of quartz, and maintaining the temperature on the cylindrical internal surface of said chamber at a point substantially adjacent the upper surface of the nutrient mass at a value of at least 380° C. and at a value between about 30° C. and 70° C. higher than the external temperature of the bomb adjacent its upper end, said temperatures being maintained until a substantial increase in the size of the seed has occurred.

13. The method of synthetically growing quartz crystals comprising suspending a quartz seed above a nutrient mass of crystalline quartz particles within a sealed bomb having an essentially cylindrical internal chamber the axis of which is disposed substantially vertically, said quartz particles having a particle size between about .01 inch and about one-quarter the diameter of the bomb, said chamber containing an amount of an aqueous solution containing sodium ions such as to fill at least 60 percent of the free space in said chamber at room temperature, heating said bomb to a temperature at which the contents of said chamber are at a temperature of at least 350° C. but below the inversion temperature of quartz, and maintaining the temperature on the cylindrical internal surface of said chamber at a point substantially adjacent the upper surface of the nutrient mass at a value of at least 380° C. and at a value between about 5° C. and 25° C. higher than the external temperature of the bomb adjacent its upper end, said temperatures being maintained until a substantial increase in the size of the seed has occurred.

References Cited in the file of this patent

UNITED STATES PATENTS 2,508,208     Wooster et al.     May 16, 1950

OTHER REFERENCES

Hale: Science, vol. 107, April 16, 1948, pp. 393–4.

Mellor: Comprehensive Treatise on Inorganic and Theoretical Chemistry, Longmans, Green and Co., London, 1925, vol. 6.

Kerr et al.: Recorded Experiments in the Production of Quartz, Bulletin of Geological Society of America, vol. 54, Supplement 1, April 1, 1943, pages 10–20.

Guellich et al.: Report on the Questioning of Prof. Pohl, Prof. Nacken, Prof. Spangenberg, Prof. Joos, Prof. Gunther, Pr. Chytrek et al. Report C–65, PB No. 6498, Office of the Publication Board, Dept. Commerce (8 pages).